(12) United States Patent
Braho et al.

(10) Patent No.: US 8,612,235 B2
(45) Date of Patent: Dec. 17, 2013

(54) METHOD AND SYSTEM FOR CONSIDERING INFORMATION ABOUT AN EXPECTED RESPONSE WHEN PERFORMING SPEECH RECOGNITION

(75) Inventors: Keith Braho, Murrysville, PA (US); Amro El-Jaroudi, Pittsburgh, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

(21) Appl. No.: 13/492,202

(22) Filed: Jun. 8, 2012

(65) Prior Publication Data

US 2012/0245939 A1 Sep. 27, 2012

Related U.S. Application Data

(63) Continuation of application No. 11/331,649, filed on Jan. 13, 2006, now Pat. No. 8,200,495, which is a continuation-in-part of application No. 11/051,825, filed on Feb. 4, 2005, now Pat. No. 7,865,362.

(51) Int. Cl.
*G10L 15/22* (2006.01)

(52) U.S. Cl.
USPC ............ 704/275; 704/270; 704/251; 704/256

(58) Field of Classification Search
USPC .................................. 704/251, 256, 270, 275
See application file for complete search history.

(56) References Cited

U.S. PATENT DOCUMENTS

| | | | |
|---|---|---|---|
| 4,882,757 A | 11/1989 | Fisher et al. | |
| 4,928,302 A | 5/1990 | Kaneuchi et al. | |
| 4,959,864 A | 9/1990 | Van Nes et al. | |
| 4,977,598 A * | 12/1990 | Doddington et al. | 704/255 |
| 5,127,043 A | 6/1992 | Hunt et al. | |
| 5,127,055 A | 6/1992 | Larkey | |
| 5,230,023 A | 7/1993 | Nakano | |

(Continued)

FOREIGN PATENT DOCUMENTS

| | | |
|---|---|---|
| EP | 0867857 A2 | 9/1998 |
| EP | 0905677 A1 | 3/1999 |

(Continued)

OTHER PUBLICATIONS

Smith, Ronnie W., An Evaluation of Strategies for Selective Utterance Verification for Spoken Natural Language Dialog, Proc. Fifth Conference on Applied Natural Language Processing (ANLP), 1997, 41-48.

(Continued)

*Primary Examiner* — Jialong He
(74) *Attorney, Agent, or Firm* — Wood, Herron & Evans, LLP (57) ABSTRACT

A speech recognition system receives and analyzes speech input from a user in order to recognize and accept a response from the user. Under certain conditions, information about the response expected from the user may be available. In these situations, the available information about the expected response is used to modify the behavior of the speech recognition system by taking this information into account. The modified behavior of the speech recognition system according to the invention has several embodiments including: comparing the observed speech features to the models of the expected response separately from the usual hypothesis search in order to speed up the recognition system; modifying the usual hypothesis search to emphasize the expected response; updating and adapting the models when the recognized speech matches the expected response to improve the accuracy of the recognition system.

18 Claims, 4 Drawing Sheets

(56) References Cited

U.S. PATENT DOCUMENTS

| | | |
|---|---|---|
| 5,297,194 A | 3/1994 | Hunt et al. |
| 5,349,645 A * | 9/1994 | Zhao .................... 704/243 |
| 5,428,707 A | 6/1995 | Gould et al. |
| 5,457,768 A | 10/1995 | Tsuboi et al. |
| 5,465,317 A | 11/1995 | Epstein |
| 5,488,652 A | 1/1996 | Bielby et al. |
| 5,566,272 A | 10/1996 | Brems et al. |
| 5,602,960 A | 2/1997 | Hon et al. |
| 5,625,748 A | 4/1997 | McDonough et al. |
| 5,640,485 A | 6/1997 | Ranta |
| 5,644,680 A | 7/1997 | Bielby et al. |
| 5,651,094 A | 7/1997 | Takagi et al. |
| 5,684,925 A | 11/1997 | Morin et al. |
| 5,710,864 A | 1/1998 | Juang et al. |
| 5,717,826 A | 2/1998 | Setlur et al. |
| 5,737,489 A | 4/1998 | Chou et al. |
| 5,737,724 A | 4/1998 | Atal et al. |
| 5,774,841 A | 6/1998 | Salazar et al. |
| 5,774,858 A | 6/1998 | Taubkin et al. |
| 5,797,123 A * | 8/1998 | Chou et al. .................... 704/256.5 |
| 5,799,273 A | 8/1998 | Mitchell et al. |
| 5,832,430 A | 11/1998 | Lleida et al. |
| 5,839,103 A | 11/1998 | Mammone et al. |
| 5,842,163 A | 11/1998 | Weintraub |
| 5,870,706 A * | 2/1999 | Alshawi .................... 704/255 |
| 5,893,057 A | 4/1999 | Fujimoto et al. |
| 5,893,059 A * | 4/1999 | Raman .................... 704/256.2 |
| 5,893,902 A | 4/1999 | Transue et al. |
| 5,895,447 A | 4/1999 | Ittycheriah et al. |
| 5,899,972 A | 5/1999 | Miyazawa et al. |
| 5,946,658 A | 8/1999 | Miyazawa et al. |
| 5,960,447 A | 9/1999 | Holt et al. |
| 5,970,450 A * | 10/1999 | Hattori .................... 704/239 |
| 6,003,002 A | 12/1999 | Netsch |
| 6,006,183 A | 12/1999 | Lai et al. |
| 6,073,096 A | 6/2000 | Gao et al. |
| 6,076,057 A | 6/2000 | Narayanan et al. |
| 6,088,669 A | 7/2000 | Maes |
| 6,094,632 A | 7/2000 | Hattori |
| 6,101,467 A | 8/2000 | Bartosik |
| 6,122,612 A | 9/2000 | Goldberg |
| 6,151,574 A | 11/2000 | Lee et al. |
| 6,182,038 B1 | 1/2001 | Balakrishnan et al. |
| 6,192,343 B1 | 2/2001 | Morgan et al. |
| 6,205,426 B1 | 3/2001 | Nguyen et al. |
| 6,230,129 B1 | 5/2001 | Morin et al. |
| 6,233,555 B1 | 5/2001 | Parthasarathy et al. |
| 6,233,559 B1 | 5/2001 | Balakrishnan |
| 6,243,713 B1 | 6/2001 | Nelson et al. |
| 6,246,980 B1 | 6/2001 | Glorion et al. |
| 6,292,782 B1 | 9/2001 | Weideman |
| 6,330,536 B1 | 12/2001 | Parthasarathy et al. |
| 6,374,212 B2 | 4/2002 | Phillips et al. |
| 6,374,220 B1 * | 4/2002 | Kao .................... 704/255 |
| 6,374,221 B1 | 4/2002 | Haimi-Cohen |
| 6,377,662 B1 | 4/2002 | Hunt et al. |
| 6,377,949 B1 | 4/2002 | Gilmour |
| 6,397,180 B1 | 5/2002 | Jaramillo et al. |
| 6,421,640 B1 | 7/2002 | Dolfing et al. |
| 6,438,519 B1 | 8/2002 | Campbell et al. |
| 6,438,520 B1 | 8/2002 | Curt et al. |
| 6,487,532 B1 | 11/2002 | Schoofs et al. |
| 6,496,800 B1 | 12/2002 | Kong et al. |
| 6,505,155 B1 | 1/2003 | Vanbuskirk et al. |
| 6,507,816 B2 | 1/2003 | Ortega |
| 6,526,380 B1 | 2/2003 | Thelen et al. |
| 6,539,078 B1 | 3/2003 | Hunt et al. |
| 6,542,866 B1 | 4/2003 | Jiang et al. |
| 6,567,775 B1 | 5/2003 | Maali et al. |
| 6,571,210 B2 | 5/2003 | Hon et al. |
| 6,581,036 B1 | 6/2003 | Varney, Jr. |
| 6,587,824 B1 | 7/2003 | Everhart et al. |
| 6,594,629 B1 | 7/2003 | Basu et al. |
| 6,598,017 B1 | 7/2003 | Yamamoto et al. |
| 6,606,598 B1 | 8/2003 | Holthouse et al. |
| 6,629,072 B1 | 9/2003 | Thelen et al. |
| 6,675,142 B2 | 1/2004 | Ortega et al. |
| 6,701,293 B2 | 3/2004 | Bennett et al. |
| 6,732,074 B1 | 5/2004 | Kuroda |
| 6,735,562 B1 | 5/2004 | Zhang et al. |
| 6,754,627 B2 | 6/2004 | Woodward |
| 6,766,295 B1 | 7/2004 | Murveit et al. |
| 6,799,162 B1 | 9/2004 | Goronzy et al. |
| 6,832,224 B2 | 12/2004 | Gilmour |
| 6,834,265 B2 | 12/2004 | Balasuriya |
| 6,839,667 B2 | 1/2005 | Reich |
| 6,856,956 B2 | 2/2005 | Thrasher et al. |
| 6,868,381 B1 | 3/2005 | Peters et al. |
| 6,871,177 B1 * | 3/2005 | Hovell et al. .................... 704/256 |
| 6,876,987 B2 | 4/2005 | Bahler et al. |
| 6,879,956 B1 | 4/2005 | Honda et al. |
| 6,882,972 B2 | 4/2005 | Kompe et al. |
| 6,910,012 B2 | 6/2005 | Hartley et al. |
| 6,917,918 B2 | 7/2005 | Rockenbeck et al. |
| 6,922,466 B1 | 7/2005 | Peterson et al. |
| 6,922,669 B2 | 7/2005 | Schalk et al. |
| 6,941,264 B2 | 9/2005 | Konopka et al. |
| 6,961,700 B2 | 11/2005 | Mitchell et al. |
| 6,961,702 B2 | 11/2005 | Dobler et al. |
| 6,985,859 B2 | 1/2006 | Morin |
| 6,999,931 B2 | 2/2006 | Zhou |
| 7,031,918 B2 | 4/2006 | Hwang |
| 7,035,800 B2 | 4/2006 | Tapper |
| 7,039,166 B1 | 5/2006 | Peterson et al. |
| 7,050,550 B2 | 5/2006 | Steinbiss et al. |
| 7,058,575 B2 | 6/2006 | Zhou |
| 7,062,435 B2 | 6/2006 | Tzirkel-Hancock et al. |
| 7,062,441 B1 | 6/2006 | Townshend |
| 7,065,488 B2 | 6/2006 | Yajima et al. |
| 7,069,513 B2 | 6/2006 | Damiba |
| 7,072,750 B2 | 7/2006 | Pi et al. |
| 7,072,836 B2 | 7/2006 | Shao |
| 7,103,542 B2 | 9/2006 | Doyle |
| 7,103,543 B2 | 9/2006 | Hernandez-Abrego et al. |
| 7,203,644 B2 | 4/2007 | Anderson et al. |
| 7,203,651 B2 | 4/2007 | Baruch et al. |
| 7,216,148 B2 | 5/2007 | Matsunami et al. |
| 7,225,127 B2 | 5/2007 | Lucke |
| 7,266,494 B2 | 9/2007 | Droppo et al. |
| 7,319,960 B2 * | 1/2008 | Riis et al. .................... 704/256.4 |
| 7,386,454 B2 | 6/2008 | Gopinath et al. |
| 7,392,186 B2 | 6/2008 | Duan et al. |
| 7,406,413 B2 | 7/2008 | Geppert et al. |
| 7,454,340 B2 | 11/2008 | Sakai et al. |
| 7,457,745 B2 | 11/2008 | Kadambe et al. |
| 7,493,258 B2 * | 2/2009 | Kibkalo et al. .................... 704/242 |
| 7,542,907 B2 | 6/2009 | Epstein et al. |
| 7,565,282 B2 | 7/2009 | Carus et al. |
| 7,684,984 B2 | 3/2010 | Kemp |
| 7,827,032 B2 | 11/2010 | Braho et al. |
| 7,865,362 B2 | 1/2011 | Braho et al. |
| 7,895,039 B2 | 2/2011 | Braho et al. |
| 7,949,533 B2 | 5/2011 | Braho et al. |
| 7,983,912 B2 | 7/2011 | Hirakawa et al. |
| 2001/0041978 A1 * | 11/2001 | Crespo et al. .................... 704/257 |
| 2002/0138274 A1 | 9/2002 | Sharma et al. |
| 2002/0143540 A1 | 10/2002 | Malayath et al. |
| 2002/0152071 A1 | 10/2002 | Chaiken et al. |
| 2002/0178004 A1 | 11/2002 | Chang et al. |
| 2002/0198712 A1 | 12/2002 | Hinde et al. |
| 2003/0023438 A1 | 1/2003 | Schramm et al. |
| 2003/0120486 A1 | 6/2003 | Brittan et al. |
| 2003/0191639 A1 | 10/2003 | Mazza |
| 2003/0220791 A1 | 11/2003 | Toyama |
| 2004/0215457 A1 | 10/2004 | Meyer |
| 2005/0049873 A1 * | 3/2005 | Bartur et al. .................... 704/256 |
| 2005/0055205 A1 | 3/2005 | Jersak et al. |
| 2005/0071161 A1 | 3/2005 | Shen |
| 2005/0080627 A1 | 4/2005 | Hennebert et al. |
| 2005/0159953 A1 * | 7/2005 | Seide et al. .................... 704/254 |
| 2006/0143009 A1 * | 6/2006 | Jost et al. .................... 704/254 |
| 2011/0029312 A1 | 2/2011 | Braho et al. |
| 2011/0029313 A1 | 2/2011 | Braho et al. |

(56) References Cited

U.S. PATENT DOCUMENTS

| | | | |
|---|---|---|---|
| 2011/0093269 A1 | 4/2011 | Braho et al. | |
| 2011/0161082 A1 | 6/2011 | Braho et al. | |
| 2011/0161083 A1 | 6/2011 | Braho et al. | |

FOREIGN PATENT DOCUMENTS

| | | | |
|---|---|---|---|
| EP | 1011094 | A1 | 6/2000 |
| EP | 1377000 | A1 | 1/2004 |
| JP | 63179398 | A | 7/1988 |
| JP | 64004798 | | 9/1989 |
| JP | 04296799 | A | 10/1992 |
| JP | 6059828 | A | 4/1994 |
| JP | 6130985 | A | 5/1994 |
| JP | 6161489 | A | 6/1994 |
| JP | 07013591 | A | 1/1995 |
| JP | 07199985 | A | 8/1995 |
| JP | 11175096 | A | 2/1999 |
| JP | 2000181482 | A | 6/2000 |
| JP | 2001042886 | A | 2/2001 |
| JP | 2001343992 | A | 12/2001 |
| JP | 2001343994 | A | 12/2001 |
| JP | 2002328696 | A | 11/2002 |
| JP | 2003177779 | A | 6/2003 |
| JP | 2004126413 | A | 4/2004 |
| JP | 2004334228 | A | 11/2004 |
| JP | 2005173157 | A | 6/2005 |
| JP | 2005331882 | A | 12/2005 |
| JP | 2006058390 | A | 3/2006 |
| WO | 0211121 | A1 | 2/2002 |
| WO | 2005119193 | A1 | 12/2005 |
| WO | 2006031752 | A2 | 3/2006 |

OTHER PUBLICATIONS

Kellner, A., et al., Strategies for Name Recognition in Automatic Directory Assistance Systems, Interactive Voice Technology for Telecommunications Applications, IVTTA '98 Proceedings, 1998 IEEE 4th Workshop, Sep. 29, 1998.

International Search Report Published Jul. 10, 2006 for WO2006/0084228.

Chengyi Zheng and Yonghong Yan, "Improving Speaker Adaptation by Adjusting the Adaptation Data Set"; 2000 IEEE International Symposium on Intelligent Signal Processing and Communication Systems. Nov. 5-8, 2000.

Christensen, "Speaker Adaptation of Hidden Markov Models using Maximum Likelihood Linear Regression", Thesis, Aalborg University, Apr. 1996.

Mokbel, "Online Adaptation of HMMs to Real-Life Conditions: A Unified Framework", IEEE Trans. on Speech and Audio Processing, May 2001.

Silke Goronzy, Krzysztof Marasek, Ralf Kompe, Semi-Supervised Speaker Adaptation, in Proceedings of the Sony Research Forum 2000, vol. 1, Tokyo, Japan, 2000.

Four-page European Search Report completed Feb. 25, 2011 for Patent Application No. 10179866.8.

Four-page European Search Report completed Feb. 28, 2011 for Patent Application No. 10179864.3.

Jie Yi, Kei Miki, Takashi Yazu, Study of Speaker Independent Continuous Speech Recognition, Oki Electric Research and Development, Oki Electric Industry Co., Ltd., Apr. 1, 1995, vol. 62, No. 2, pp. 7-12.

Osamu Segawa, Kazuya Takeda, An Information Retrieval System for Telephone Dialogue in Load Dispatch Center, IEEJ Trans. EIS, Sep. 1, 2005, vol. 125, No. 9, pp. 1438-1443.

* cited by examiner

METHOD AND SYSTEM FOR CONSIDERING INFORMATION ABOUT AN EXPECTED RESPONSE WHEN PERFORMING SPEECH RECOGNITION

RELATED APPLICATIONS

This application is a divisional application of U.S. patent application Ser. No. 11/331,649, entitled Method and System for Considering Information About an Expected Response When Performing Speech Recognition filed Jan. 13, 2006, which is a continuation-in-part application of U.S. patent application Ser. No. 11/051,825, entitled Method and System for Considering Information About an Expected Response When Performing Speech Recognition filed Feb. 4, 2005, now Issued U.S. Pat. No. 7,865,362 issued on Jan. 4, 2011, which applications are incorporated herein by reference in their entireties.

TECHNICAL FIELD

The present invention relates to speech recognition and, more particularly, to improving the speed and accuracy of speech recognition systems when one or more expected responses are likely.

BACKGROUND ART

Speech recognition has simplified many tasks in the workplace by permitting hands-free communication with a computer as a convenient alternative to communication via conventional peripheral input/output devices. A worker may enter data by voice using a speech recognizer and commands or instructions may be communicated to the worker by a speech synthesizer. Speech recognition finds particular application in mobile computing devices in which interaction with the computer by conventional peripheral input/output devices is restricted.

For example, wireless wearable terminals can provide a worker performing work-related tasks with desirable computing and data-processing functions while offering the worker enhanced mobility within the workplace. One particular area in which workers rely heavily on such wireless wearable terminals is inventory management. Inventory-driven industries rely on computerized inventory management systems for performing various diverse tasks, such as food and retail product distribution, manufacturing, and quality control. An overall integrated management system involves a combination of a central computer system for tracking and management, and the people who use and interface with the computer system in the form of order fillers, pickers and other workers. The workers handle the manual aspects of the integrated management system under the command and control of information transmitted from the central computer system to the wireless wearable terminal.

As the workers complete their assigned tasks, a bi-directional communication stream of information is exchanged over a wireless network between wireless wearable terminals and the central computer system. Information received by each wireless wearable terminal from the central computer system is translated into voice instructions or text commands for the corresponding worker. Typically, the worker wears a headset coupled with the wearable device that has a microphone for voice data entry and an ear speaker for audio output feedback. Responses from the worker are input into the wireless wearable terminal by the headset microphone and communicated from the wireless wearable terminal to the central computer system. Through the headset microphone, workers may pose questions, report the progress in accomplishing their assigned tasks, and report working conditions, such as inventory shortages. Using such wireless wearable terminals, workers may perform assigned tasks virtually hands-free without equipment to juggle or paperwork to carry around. Because manual data entry is eliminated or, at the least, reduced, workers can perform their tasks faster, more accurately, and more productively.

An illustrative example of a set of worker tasks suitable for a wireless wearable terminal with voice capabilities may involve initially welcoming the worker to the computerized inventory management system and defining a particular task or order, for example, filling a load for a particular truck scheduled to depart from a warehouse. The worker may then answer with a particular area (e.g., freezer) that they will be working in for that order. The system then vocally directs the worker to a particular aisle and bin to pick a particular quantity of an item. The worker then vocally confirms a location and the number of picked items. The system may then direct the worker to a loading dock or bay for a particular truck to receive the order. As may be appreciated, the specific communications exchanged between the wireless wearable terminal and the central computer system can be task-specific and highly variable.

During the interchange between the worker and the system, there may be instances where the system expects a specific response from the worker (e.g., when the worker is confirming his or her location). It is desirable to use the expected response information to reduce inefficiencies in a speech recognition system. Several such systems and methods are disclosed in the parent application U.S. patent application Ser. No. 11/051,825 noted above. It is further desirable to speed up the speech recognition system, improve the accuracy of the speech recognition system, and improve the acoustic models used by the speech recognition system. It is desirable to further address inefficiencies, delays and costs associated with voice-directed tasks and work, as noted above and to improve an overall speech recognition system. It is further desirable to improve a speech recognition system wherein a specific response is expected from the user.

BRIEF DESCRIPTION OF THE DRAWINGS

The accompanying drawings, which are incorporated in and constitute a part of this specification, illustrate speech recognition system components and embodiments of the invention and, together with the detailed description of the embodiments given below, serve to explain the principles of the invention.

DETAILED DESCRIPTION OF EMBODIMENTS OF THE INVENTION

Technical Introduction

Figure 1:
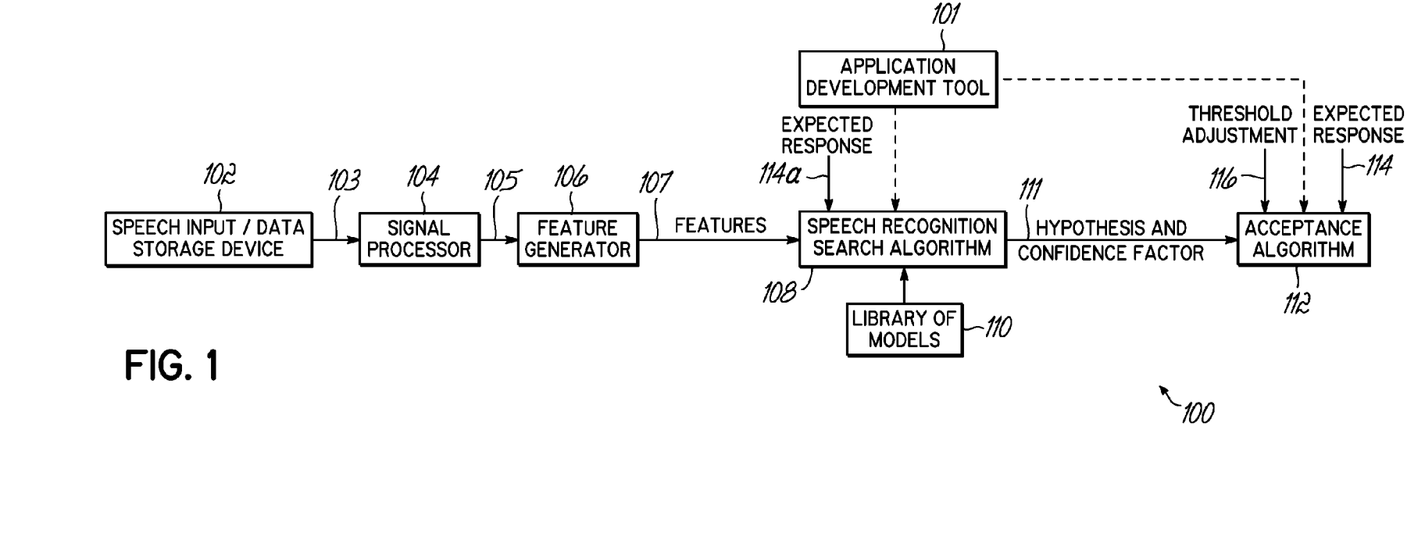
FIG. 1 illustrates a schematic view of a speech recognition system.

FIG. 1 illustrates a schematic view of a speech recognition system in accordance with the present invention. One of ordinary skill in the art will recognize that the various functional blocks of the speech recognition system, including the inventive features, can be implemented using a variety of different technologies. The invention can be implemented into various different hardware and software configurations. One particular application for the invention is within a portable or wearable terminal that is used for voice-directed work. However, other implementations are possible as well and the invention is not limited to such voice-directed work applications. Furthermore, to implement various features of the inventive embodiment, the speech recognition software might be modified. Alternatively, a separate program might be utilized to modify the speech recognition system according to aspects of the invention.

Referring to FIG. 1 in system 100, a speech signal, such as from a system user, may be captured by a speech input device 102 in a variety of conventional ways. Typically, a microphone or other electro-acoustical device senses speech input from a user and converts it into an analog voltage signal 103 that then is forwarded to a signal processor 104. As is conventionally known, the signal processor 104 includes the necessary analog-to-digital converters, filters, and equalization circuitry that convert the analog speech input 103 into a digitized stream of data 105 that can be separated into separate units for analysis. Alternatively, this audio data from device 102 can be retrieved from a data storage device. As discussed herein, the system 100 might be realized by suitable hardware and software. As such, the blocks shown in FIG. 1 are not meant to indicate separate circuits or to be otherwise limiting, but rather show the functional features and components of the system.

In particular, the signal processor 104 divides the digital stream of data that is created into a sequence of time-slices, or frames 105, each of which is then processed by a feature generator 106, thereby producing a vector, matrix, or otherwise organized set of numbers 107 representing the acoustic features of the frames. Further explanation of an exemplary speech recognition system is provided in U.S. Pat. No. 4,882,757, entitled SPEECH RECOGNITION SYSTEM, the disclosure of which is incorporated herein, by reference, in its entirety. This referenced patent discloses Linear Predictive Coding (LPC) coefficients to represent speech; however, other functionally equivalent methods are contemplated within the scope of the present invention as well.

A speech recognition search algorithm function 108, realized by an appropriate circuit or software in the system 100 analyzes the feature vectors 107 in an attempt to determine what hypothesis to assign to the speech input captured by input device 102. As is known in the art in one recognition algorithm, the recognition search 108 relies on probabilistic models from a library of suitable models 110 to recognize the speech input 102. Some of the models in the library 110 may be customized to a user via templates or other means, while some models may be generic to all users.

When in operation, the search algorithm 108, in essence, compares the features 107 generated in the generator 106 with reference representations of speech, or speech models, in library 110 in order to determine the word or words that best match the speech input from device 102. Part of this recognition process is to assign a confidence factor for the speech to indicate how closely the sequence of features from the search algorithm 106 matches the closest or best-matching models in library 110. As such, a hypothesis consisting of one or more vocabulary items and associated confidence factors 111 is directed to an acceptance algorithm 112. If the confidence factor is above a defined acceptance threshold, then the recognized speech is accepted by the acceptance algorithm 112. Acceptance algorithm 112 may also be realized by an appropriate circuit or software component of the system 100. If, however, the confidence factor is not above the acceptance threshold, as utilized by the acceptance algorithm, then the acceptance algorithm 112 ignores or rejects the recognized speech or prompts the user to repeat the speech. In this instance, the user may repeat the speech to input device 102.

One common modeling technique utilized for speech recognition includes Hidden Markov Models (HMM). In speech recognition, these models use sequences of states to describe vocabulary items, which may be words, phrases, or subword units. As used herein, the term "word" is used to denote a vocabulary item, and thus may mean a word, a segment or part of a word, or a compound word, such as "next slot" or "say again." Therefore, the term "word" is not limited to just a single word. Each state in an HMM represents one or more acoustic events and serves to assign a probability to each observed feature vector. Accordingly, a path through the HMM states produces a probabilistic indication of a series of acoustic feature vectors. The model is searched such that different, competing hypotheses (or paths) are scored; a process known as acoustic matching or acoustic searching. A state S can be reached at a time T via a number of different paths. For each path reaching a particular state at a particular time, a path probability is calculated. Using the Viterbi algorithm, each path through the HMM can be assigned a probability. In particular, the best path can be assigned a probability. Furthermore, each word in the best path can be assigned a probability. Each of these probabilities can be used as a confidence factor or combined with other measurements, estimates or numbers to derive a confidence factor. The path with the highest confidence factor, the best hypothesis, can then be further analyzed. Other paths, including those that are not the best hypothesis can also be analyzed as described herein. (The other paths are often referred in the literature as n-best hypotheses or n-best list.) The confidence factor of the hypothesis or the confidence factors of each word in the hypothesis can be compared with an acceptance threshold. It should be understood that other speech recognition models are also contemplated within the scope of the present invention; for example, template matching dynamic time warping (DTW) and neural networks are two such exemplary, alternative modeling techniques.

While existing speech recognition systems generally address the task of determining the spoken input and recognizing the speech, there are still some drawbacks in such systems. For example, all of the hypotheses generated by the system, even the best-scoring hypothesis, may have confidence factors that fall below the acceptance threshold. In such a situation, the speech is rejected and may have to be repeated. As noted, this reduces productivity and efficiency. The invention as set forth in the parent U.S. patent application Ser. No. 11/051,825 addresses such issues and improves upon the recognition efficiency by using expected speech to modify the acceptance threshold.

More specifically, in certain environments utilizing speech recognition systems, the expected speech or expected response to be received from a user is known beforehand or can be determined. For example, when picking a part from a bin, or placing an item in a warehouse location, there can be a check-digit that verifies the location of the user or the operation being performed by the user. During the operation, the user is prompted to go to a location and speak the check-digit (or check-phrase) displayed at and associated with the location. The speech recognition system attempts to recognize the user's spoken response and compare it with this check-digit or check-phrase to confirm that the user is at the correct location before prompting the user to perform an operation, such as picking a case of product. As used herein, "check-digit" refers to the set of one or more words that are associated with a location, bin or slot for the purpose of verifying a user's location. A "check-digit" may, for example, be a three-digit number, or non-digit words, or a combination of these. In addition to this exemplary environment, there may be other scenarios in which a particular response or series of responses is expected from the user. For example, the expected response might be obtained by at least one of evaluating an expression or retrieving the expected response from a table or data structure prior to comparing the hypothesis to the expected response. Alternatively, the expected response might be dynamically determined prior to the comparison. Other such examples are described in US patent application 2003/0154075 and include password verification, quantity verification, and repeat/acknowledge messages. The exemplary embodiments of the parent U.S. patent application Ser. No. 11/051,825 and described herein involve situations wherein one (or more) known expected response(s) are utilized to improve speech recognition systems. In addition to these exemplary environments, an expected response may be known in other situations when a recognizer is waiting for a response from the user. As recognized by one of ordinary skill, the principles of the present invention can be advantageous within these situations as well.

Figure 2:
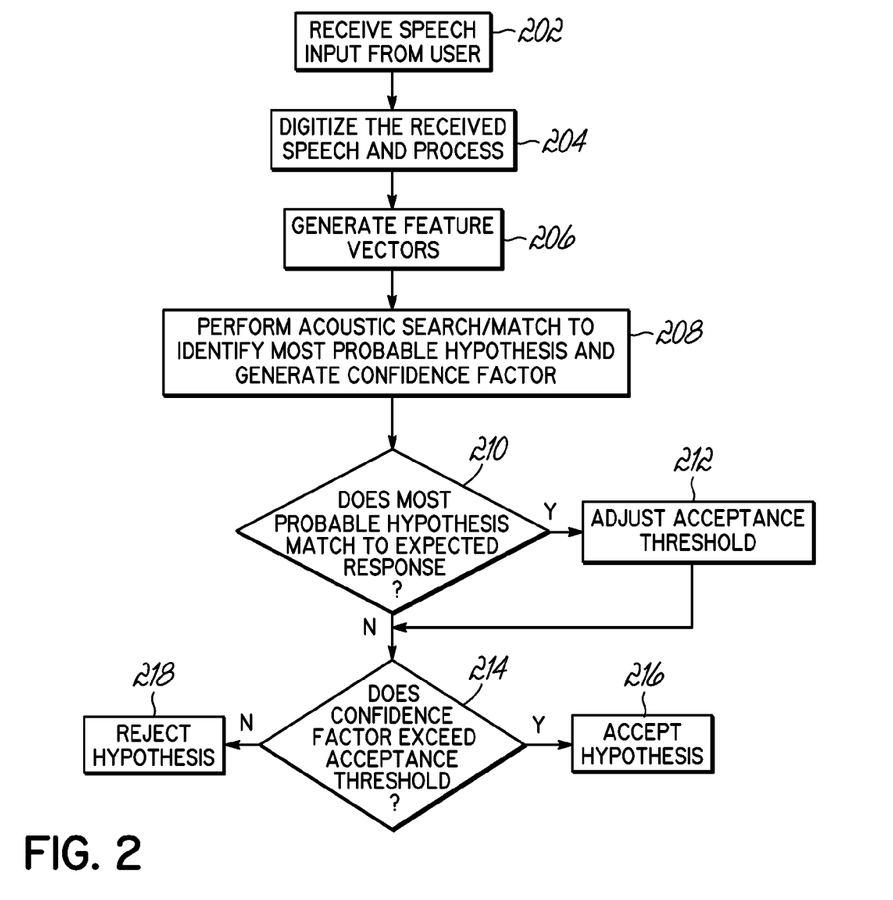
FIG. 2 illustrates a flowchart of an example for modifying the behavior of the acceptance threshold of a speech recognition system based on knowledge about an expected response from a user.

FIG. 2 illustrates a flowchart of an exemplary embodiment for modifying the behavior of an acoustic match/search process of a speech recognizer in accordance with aspects of the parent U.S. patent application Ser. No. 11/051,825. In step 202, speech input is received from the user by an appropriate device 102 or is pulled from storage. The speech input is then digitized in step 204, such as by signal processor 104. As is known in the art, the digitized speech is separated, in step 206, into time slices and converted into feature vectors, such as by feature generator 106. As explained earlier, these feature vectors correspond to information within an acoustic model that allows a search and match to be performed to identify the most likely, or most probable, sequence of words spoken by the user. Step 208 reflects the match/search routine to determine a hypothesis with the highest associated confidence factor. Such a match/search routine may be performed utilizing the speech recognition search algorithm 108 and model library 110 as shown in FIG. 1.

In accordance with the principles of that invention, this most probable sequence, or the hypothesis with the highest confidence factor, is compared, in step 210, to an expected response that was known beforehand. Then, based upon such a comparison, the acceptance algorithm is modified. If the comparison shows that the most probable speech hypothesis matches an expected response, the hypothesis is more favorably treated. Specifically, the acceptance threshold is modified by being downwardly adjusted or lowered in order to allow speech that may otherwise be rejected to be accepted and output as recognized by system 100.

In accordance with various alternative embodiments of the present invention, this knowledge about the response that is expected from the user (expected response) is utilized in a multitude of other ways to improve performance of the speech recognition system and thus improve the overall efficiency and cost effectiveness of the system.

DETAILED DESCRIPTION OF EMBODIMENTS

This invention presents several other approaches to improving a speech recognition system when a specific response is expected from the user (expected response). That is, knowledge of the expected response is used by the speech recognition algorithm or system to improve the overall speech recognition process. In one embodiment, the recognition system compares the observed speech features only to the models of the expected response and if the match is satisfactory, then the expected response is accepted. If the match is not satisfactory, then the observed features are processed by the search algorithm in the normal fashion, i.e., the features are compared to the models of all the words possible at this point in the grammar. The advantage of this approach is great computational savings anytime the expected response is given by the user. This reduction in computation will allow the recognition system to produce a result with very little delay if any, thereby increasing the efficiency and productivity of the user.

In still another approach, the recognition system alters its acoustic models and its search strategy through the possible models to favor the expected response. The alterations affect parameters such as word insertions penalties, state transition penalties and pruning levels.

In the still another approach, the recognition system performs unsupervised adaptation when the observed features produce a hypothesis that matches the expected response. The observed features are then used to adapt the models. This improves the accuracy of the speech recognition system for future utterances.

Figure 3:
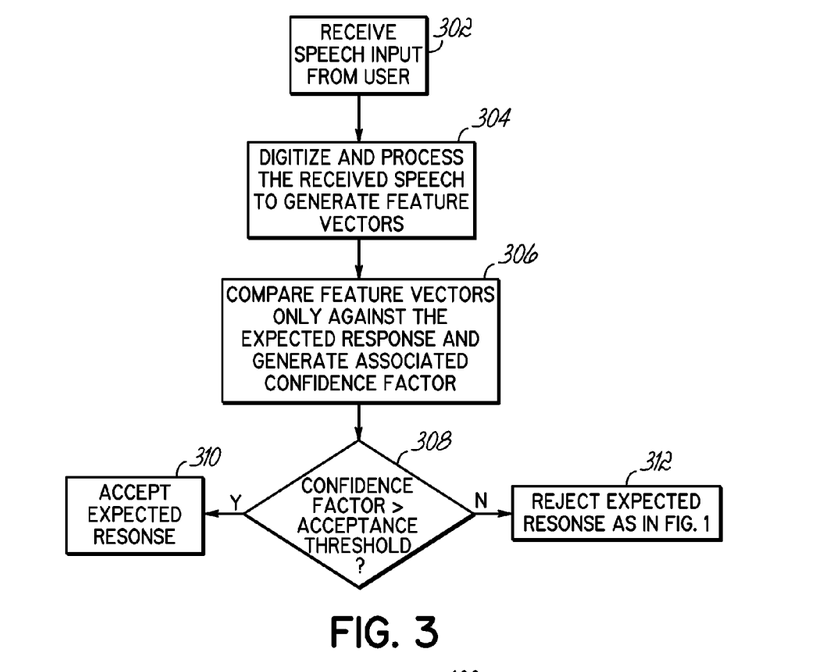
FIG. 3 is a flowchart illustrating the operation of an embodiment of the invention that uses knowledge about an expected response to improve the speed of a speech recognition system.

The embodiments of the invention disclosed herein might be incorporated in one or more appropriate circuits in the system 100 or software for such a system as shown in FIG. 1. For example, the embodiments might be incorporated into the processing circuitry and hardware or the software associated with the search algorithm 108 as shown. To that end, information or data regarding an expected response 114a might be provided to algorithm 108 for implementing the invention. Of course, the positioning of the appropriate hardware in the overall system is not limited to such an example. FIG. 3 illustrates a flowchart of an embodiment of the invention that uses knowledge about an expected response to improve the speed of a speech recognition system. As explained above, a speech recognizer searches through an HMM, or other type of model, to find a list of probable matches and then analyzes the potential matches accordingly. In such an acoustic match/search technique, all the different paths of the model are traversed until being eliminated according to the Viterbi algorithm, or similar decision process as will be understood by a person of ordinary skill in the art.

In accordance with the embodiment of the invention as set forth in the flowchart of FIG. 3, in step 302, speech input is received from a user in a suitable fashion, such as through a microphone. The received or input speech is then digitized and separated into various feature vectors as noted in step 304. In step 306, the speech recognizer analyzes the received speech input, in the form of such feature vectors, and compares the features of the input speech against only those models of the expected response in the match/search algorithm rather than against all of the models of all the possible responses. That is, only the model(s) associated with the expected response are utilized in the match/search algorithm, rather than utilizing all of the possible models associated with all possible responses that the user might give or speak. The system then determines a confidence factor for the input speech based on such speech analysis and comparison, and the resulting confidence factor is compared against the acceptance threshold, as noted in step 308.

If the confidence factor, based upon the direct comparison of the input speech to the expected response, exceeds the acceptance threshold, then the hypothesis is accepted in step 310. Because of the direct nature of such analysis, this embodiment allows dramatic response time improvements in the speech recognition. This approach requires less computation time, because it is simpler, and therefore faster, to compute a confidence factor of a single sequence of words by comparing the observed speech features to a single option or model (i.e., the expected response) than it is to search for the best sequence of words from a large set of possible options.

Alternatively, if the confidence factor is below the acceptance threshold based upon such an expected response analysis, then the speech is analyzed to obtain the most likely hypothesis in the typical fashion. (e.g., as shown in FIG. 1). In another embodiment, both processes (i.e., comparing the observed features against the model of the expected response as well as producing the most likely hypothesis using a search through all the possible models) can be performed simultaneously with the first process having higher priority than the second. Also the confidence factor resulting from comparing the features to the model of the expected response may be compared to the standard acceptance threshold or to an adjusted threshold (such as one adjusted downwardly) with the adjustment and comparison taking place as described in parent U.S. patent application Ser. No. 11/051,825. Alternatively, the confidence factor could be compared to a different, higher (more discriminating) acceptance threshold. It may be desirable to do this to prevent the expected response from erroneously being recognized when the user did not say it, such as in systems and/or conditions when there is a sufficiently high likelihood that this may occur. Therefore the acceptance threshold may be adjusted upwardly or downwardly.

An example is helpful in illustrating such an embodiment of the invention. In a typical voice-directed work dialog, with a central system or computer interfacing with a plurality of portable terminals carried or worn by workers, the voice interface may ask the worker to speak certain information, such as a numerical check digit. For example, in the picking application described earlier, the user may be directed to a shelf or bin and asked to pick a product and speak a two-digit numerical check digit to indicate that they are at the proper shelf or bin. The possible responses for a single numerical word spoken by the user are "zero" to "nine" and thus with a two-digit check digit, there are 100 possible combinations. The user will then speak the two-digit check digit, for example "three five" (3, 5). The system or terminal, pursuant to an aspect of the invention, knows that the expected response from the user for the desired check digits at that shelf or bin are the words "three five". In the invention, the speech recognizer only compares the observed features of the spoken words to the model associated with the expected response of "three five". That is, effectively a single response model is used in the analysis. Without the invention, the speech recognition system would compare the observed features of the user's spoken words to the models corresponding to the 100 possible combinations of two-digit check digits. As may be appreciated, this is relatively time consuming. With the invention however, the speech recognition system compares the observed features with only those of the expected response (the check digit corresponding to the location to which the user was directed 3, 5) resulting in a computation time savings of a factor of 100 whenever the user goes to the correct shelf and says the expected response.

If the observed features are not a good match to those corresponding to the expected response, the speech recognition system would then examine all 100 or just the remaining 99 possible combinations. Therefore, in one aspect of the invention, if the initial comparison does not a produce a match of the expected response, the speech recognition might proceed as normal and compare the input speech to all of the remaining or available models.

In one embodiment, only a single expected response is used. Alternatively, there may be several possible expected responses that form a subset within a larger set of possible responses. For example, a set or subset of responses might be stored in memory for use in such fashion. The comparison of the input speech might be made to the expected responses in the smaller subset rather than to all possible responses, thus realizing a time savings, although not as large as that realized using the comparison to just a single expected response.

In addition to the embodiments described above, the present invention contemplates additional embodiments and ways to use information about an expected response to improve the accuracy and efficiency of a speech recognition system. In an alternative embodiment, the acoustic match/search algorithm itself may be modified based on the expected response. For example, in one suitable speech recognition scenario using HHM models and the Viterbi algorithm, probabilities are associated with transitions between various states, with the observation of an output from a state, and with starting at an initial state. In accordance with one aspect of the invention, the transition probabilities, which may be thought of as the cost or penalty for changing from one state to another state, are modified based on the knowledge of an expected response and the likely state transitions that the expected response would elicit. By changing the state transition costs or transition probabilities within the model, one path can be scored higher or lower based on the knowledge about the expected response. Therefore, in one embodiment of the invention, the match/search and recognition algorithm, that is, the models and paths that the spoken words traverse in the analysis process, are modified to boost the overall probability or confidence factor of the input speech if it closely matches that expected response.

Other modifications or changes may be made to the acoustic match/search process. For example, the initial state probability or insertion penalty, or word insertion penalty may be modified to affect the overall outcome of the process. Alternatively, applying a bias or penalty per frame of the spoken word(s) can also be used to affect the path through the models that results in the highest score. Also, the pruning algorithm responsible for eliminating low scoring hypotheses during the search of various search algorithms may be modified to make sure it does not eliminate search path associated with the expected response. One of ordinary skill will recognize that there are a number of ways to modify the way the acoustic match/search process scores the different possible alternatives in a model; however, in accordance with the principles of the present invention, these different scoring techniques are modified based on knowledge about an expected response.

Such an improvement will emphasize the expected response by boosting the score or probability/confidence factor of its hypothesis. For example, an expected response that is the correct recognition may actually be the second or third highest-scoring hypothesis due to its probability score from a typical match/search process. Therefore, the expected response (and correct recognition) might be lost or disregarded because it is not initially the hypothesis with the highest probability score. However, using the invention to modify the match/search process as disclosed herein, the expected response is essentially allowed to become the number one or highest-scoring hypothesis.

Figure 4:
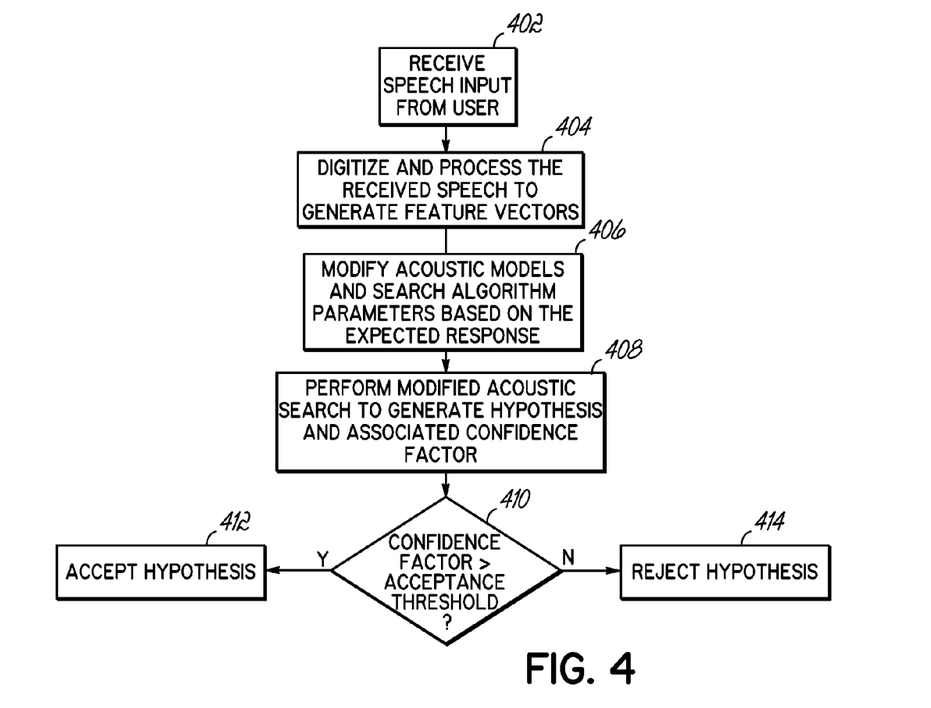
FIG. 4 is a flowchart illustrating the operation of another alternative embodiment of the invention that uses knowledge about an expected response to improve the accuracy of a speech recognition system.

In FIG. 4, a flowchart is depicted which illustrates this alternative embodiment of the invention in the form of a method for modifying the search to improve a speech recognition system based on the expected response. Similar to previously described methods, speech input is received in step 402 and processed in step 404 to create feature vectors that can be used during an acoustic match/search process. In step 406, the acoustic model being searched is modified based on the expected response. More specifically, the acoustic model is modified to generally favor the expected response. For example, these changes may involve adjusting the cost or penalties associated with different transitions or states within the model based on their likelihood of occurrence in view of the expected response. Alternatively other modifications or changes may be made to the acoustic match/search process including modifying the initial state probability or insertion penalty, or applying a bias, or boost or penalty per frame as noted above.

Returning to the flowchart of FIG. 4, in step 408, the hypothesis is identified by the modified acoustic match/search process along with an associated confidence factor. Then, in step 410, the confidence factor of the hypothesis is compared to the acceptance threshold. If the comparison is favorable, then the speech is recognized and accepted in step 412. If not, then the speech is rejected and the user can repeat the speech in step 402.

In accordance with another embodiment of the invention, at least some of the speech recognition models contemplated within the scope of the present invention utilize adaptive learning or training based upon the expected response. As is known to those skilled in the art of speech recognition, as more speech samples are received and processed by a speech recognition system, the accuracy of the models can be improved through training or other learning or adaptation algorithms. This training and/or adaptation can be in a supervised manner or in an unsupervised manner. The present invention utilizes the expected response as a trigger for providing adaptation/training and enables such adaptation/training in a semi-supervised mode, eliminating the drawbacks of supervised and unsupervised training and adaptation. More specifically, when the hypothesis resulting from the input speech compares favorably with the expected response, the results of such a comparison are utilized as a feedback to provide adaptation of the acoustic models of the speech recognition system. This provides significant advantages over existing adaptation.

For example, unsupervised training algorithms, where a reliable transcript of the speech samples is not available to the system, often suffer from instability or require compromises that limit the improvements to the recognition accuracy that the unsupervised training algorithms can deliver. In unsupervised adaptation and training, the models are created and adapted while the user is speaking. Thus, models can constantly be improved as the user uses the system and provides spoken commands and responses. However, such unsupervised adaptation uses input speech with unreliable machine-generated transcription that can make the models go bad or degrade very quickly (e.g., a cough or other random noise might be interpreted as a word and used to update the models of that word).

On the other hand, supervised training, where a reliable transcript of the speech samples is known, typically requires a time investment either by the user, where he reads a known transcript, or by a transcriptionist where a speech sample is manually transcribed to generate the reliable transcript. Supervised training thus requires additional burdensome time or cost, and does not offer the benefit that performance improves as the user uses the system. For example, in supervised training or adaptation, a user may speak a variety of words from defined templates or transcripts that are then used to make or train the models for the speech recognition engine. That is, the models are trained and adapted with the known transcripts. While this process enables the creation of good models, such training/adaptation is also slow and requires the user to spend significant time training and adapting the system.

The present invention's use of an expected response offers several advantages over prior approaches, both supervised and unsupervised. Compared to an unsupervised system, the combination of the expected response provided by the application and the acoustic match of the recognizer enables a much more reliable transcript to be generated. This prevents the instability problems, removing the need for compromises that limit recognition accuracy. For example, random noise will not match an expected response and thus will not be utilized in the adaptation provided by the invention.

The invention's advantages over supervised training include reduced time and cost by eliminating the step of generating a reliable transcript for a sample of audio (or collecting audio from a user given a transcript). The invention has the added advantages that it can continuously adapt to the user's new speaking patterns and any other artifacts in the audio, such as effects from microphones or background noise. This training using the knowledge of the expected response can adapt the prior models (adaptation) or create new models based on the data (training). This improves the future performance of the speech recognition system.

One advantageous method of adapting the models is to take advantage of the outcome of the acoustic match/search processes that implement one or more of the improvement methods described herein that take into account knowledge about an expected response. For example, using the invention as described with relation to FIG. 2, the confidence factor may initially be too low to allow acceptance of the speech input but will ultimately exceed the acceptance threshold value when the before-hand knowledge about the expected response is taken into account in accordance with one aspect of the invention. In accordance with the invention, the model may be adapted or trained with this speech input that is reflective of the expected response. As a result, the next time a similar speech input is received by the speech recognition system, the adapted model is more likely to initially recognize and accept the speech even before the acceptance threshold is adjusted. Therefore, adjustment of the acceptance threshold as noted with FIG. 2 above may not have to be constantly applied once the model has been adapted properly to take into account the past feedback regarding the expected response. This results in further efficiencies and time savings in the system.

Similarly, the other methods of FIG. 3 and FIG. 4 provide an opportunity for the speech recognition system to accept a word based on before-hand knowledge in instances in which it would have otherwise rejected the speech input as unrecognizable. Each of these implementations of the invention allows the speech model to be taught and adapted using an expected response so as to improve future accuracy. For example, in the embodiment of FIG. 3 if the hypothesis matches just the expected response and the confidence factor exceeds the threshold, the speech input may be utilized to further adapt the models of the match/search algorithm. In essence, the expected response is the intended outcome of the acoustic match/search through the model, and the received speech from the user is the input to the process. Using such matched input/output pairs, one of ordinary skill will appreciate many techniques for adapting and refining the models, all of which are contemplated within the scope of the present invention.

Figure 5:
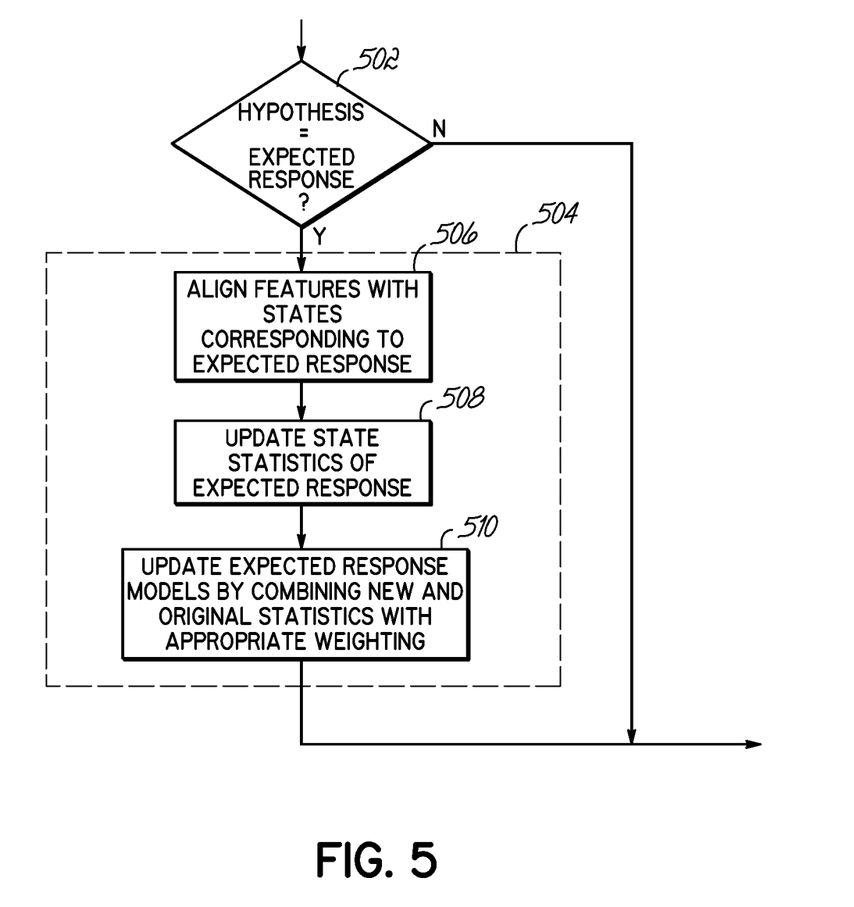
FIG. 5 is a flowchart illustrating the operation of another alternative embodiment of the invention for improving the models used by a speech recognition system based on knowledge about an expected response.

FIG. 5 describes one embodiment of the proposed adaptation based on the hypothesis matching the expected response. In step 502, the hypothesis determined from the speech recognition engine is compared to the expected response. If the comparison is favorable then, in step 504, the acoustic models of the expected response are updated using the features associated with the hypothesis. That is, the determination that the best hypothesis matches the expected response acts as a trigger for providing the adaptation. In one embodiment, the adaptation may be automatic each time that the comparison of step 502 indicates that the hypothesis matches the expected response. In another embodiment the adaptation might occur only if the comparison meets additional specific criteria. For example, additional rules can be applied to control the update of the acoustic models. In one example, the acoustic models for a given word in the expected response may be updated only if the confidence factor associated with the word exceeds a minimum amount or falls within a specific range, indicating a successful comparison. Other criteria may be that this situation of a successful comparison occurs a minimum number of times.

It will be understood by a person of ordinary skill in the art that the match/search algorithm for a speech recognition system may be adapted in a number of different ways. One suitable adaptation involves adapting the acoustic model(s) associated with the expected response using features from words that are spoken by the user (i.e. input speech) that compares favorably to the expected response. The adaptation in step 504, for example, is performed by aligning the observed features of the input speech with the states in the models associated with the words in the expected response (step 506). Then the statistics (e.g., means and variances) of said states are updated using the values of the observed features of the input speech (step 508). For example, the Baum-Welch re-estimation algorithm might be used to perform such alignment. These values are mixed into the models with the appropriate weighting (step 510) to maintain a balance between the previous training data and the new features. Thus, in one embodiment of the invention using the expected response as a trigger for adaptation, the new models are created through adaptation by using the observed features of the input speech to adapt the existing or original models. In that scenario, both the observed features of the input speech and the existing features of the original models, and the statistics associated with each, are used to create the new models. Additionally, in such a scenario, the new statistics might be weighted in various fashions to tailor their effect on the original statistics in the model.

In an alternative embodiment of the invention, only the new observed features, and information therefrom, might be utilized to create the new model. That is, a new model is created with the new features only.

In general, the adaptation could be performed using data from a single user or multiple users. In one particular embodiment, only speech data from an individual user might be used to perform the adaptation. This generates a model that is adapted for that user and performs well for that user.

The present invention, in its various forms, may be implemented directly in the software of a speech recognition program or system. That is, the improvements are actually part of the speech recognition algorithm. Alternatively, the invention does not have to be built into the recognizer. Rather a separate program or application may be utilized that uses a speech recognizer and the expected response to provide the benefits of the invention.

For example a separate application or software module may be utilized to handle the adaptation in accordance with the principles of the invention. Specifically, an application may interface with a speech recognizer to control when and how the speech recognizer is adapted. The application uses the information associated with the expected response and other information such as the results of the comparison between the expected response and the input speech of the user to tell the recognizer to adapt using the audio features associated with the expected response. The separate adapting application may then control how the adaptation progresses and also determine the criteria to be met before adaptation is ordered. Furthermore, once adaptation is to proceed, the application may determine whether the existing models are replaced with new models created with the new features only or whether the existing models are just adapted using information from both the new features and the existing features of the existing models.

In various of the scenarios that are discussed herein, the expected response is in the form of a string of words, such as a response within a voice-directed work dialog for example. In other scenarios, the expected response comparison might incorporate a rule rather than a matching scenario. For example, US Patent Application 2003/0154075 (incorporated herein by reference in its entirety) incorporates other scenarios to determine if a response in the input speech is a proper or expected response, such as checksum algorithms, database matching etc. The selective adaptation provided by the present invention utilizing the features of the input speech that are verified as an expected response may use these other rules or scenarios as the trigger for adaptation in accordance with the present invention.

Thus, while the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept. For example, the exemplary speech recognition system described herein has focused on wearable wireless terminals. However, the principles of the present invention are applicable to other speech recognition environments as well.

What is claimed is:

1. A method for recognizing speech in a speech recognition system comprising the steps of:

receiving input speech from a user in a speech dialog where there is at least one point in the speech dialog where there is a grammar of possible responses and at least one expected response, the at least one expected response being a subset of the grammar and known to be the at least one expected response in the speech recognition system before receiving the user input speech, the at least one expected response including the most likely response or responses expected to be uttered by the user at the at least one point in the speech dialog and having a model associated therewith;

generating acoustic features of the input speech;

directly comparing the input speech acoustic features only to the model that is associated with the at least one expected response, rather than to models associated with additional possible responses, to generate an associated confidence factor;

comparing the confidence factor to an acceptance threshold for accepting the expected response as the result of the speech recognition.

2. The method of claim 1 further comprising adjusting the acceptance threshold based on the comparison of the input speech acoustic features to the model that is associated with the at least one expected response in order to affect the acceptance of the expected response.

3. The method of claim 1 further comprising, if the comparison to the model that is associated with the expected response does not yield a confidence factor exceeding the acceptance threshold, comparing the input speech acoustic features to models associated with additional possible responses.

4. The method of claim 1 wherein the subset includes only a single expected response.

5. An apparatus for recognizing speech comprising:

circuitry for receiving input speech from a user as part of a speech dialog where there is at least one point in the speech dialog where there is a grammar of possible responses and at least one expected response, the at least one expected response being a subset of the grammar and known to be the at least one expected response in the speech recognition system before receiving the user input speech, the at least one expected response including the most likely response or responses expected to be uttered by the user at the at least one point in the speech dialog and having a model associated therewith, the circuitry configured for generating acoustic features of the input speech;

processing circuitry operable for directly comparing the input speech acoustic features to the model that is associated with the at least one expected response, rather than to models associated with additional possible responses, to generate an associated confidence factor and for comparing the confidence factor to an acceptance threshold for accepting the expected response as the recognized speech.

6. The apparatus of claim 5 wherein the comparison of the input speech acoustic features includes using the model that is associated with at least one expected response in a match/search algorithm.

7. The apparatus of claim 5 wherein the processing circuitry is further operable to adjust the acceptance threshold based on the comparison of the input speech features to the model that is associated with at least one expected response in order to affect the acceptance of the expected response.

8. The apparatus of claim 5 wherein the processing circuitry compares the input speech features to models associated with additional responses, if the comparison to the model that is associated with the expected response does not yield a confidence factor exceeding the acceptance threshold.

9. A method for recognizing speech in a speech recognition system comprising the steps of:

in a speech dialog where there is a grammar of possible responses and at least one expected response, determining an expected response to be received as input speech from a user in at least one point in the speech dialog, the at least one expected response being a subset of the grammar and known to be the at least one expected response in the speech recognition system before receiving the user input speech, the at least one expected response including the most likely response or responses expected to be uttered by the user at the at least one point in the speech dialog and having a model associated therewith;

based upon the determined expected response, modifying a speech recognition match/search algorithm with respect to the model that is associated with the expected response so that the match/search algorithm is configured to favor the expected response and boost a confidence factor associated with a hypothesis generated by the modified speech recognition match/search algorithm;

processing input speech from a user using the modified match/search algorithm to generate a hypothesis and confidence factor for the input speech.

10. The method of claim 9 further comprising comparing the hypothesis confidence factor to an acceptance threshold for accepting the hypothesis.

11. The method of claim 9 wherein the match/search algorithm processes the input speech through a plurality of states and the method further comprises at least one of modifying transition probabilities associated with transitions between multiple states in the match/search algorithm or modifying initial state probabilities associated with a path through multiple states in the match/search algorithm.

12. The method of claim 9 wherein the match/search algorithm utilizes multiple paths through acoustic models for the input speech and the method further comprises at least one of modifying the acoustic models based on the expected response or modifying the insertion penalty associated with a given acoustic model.

13. The method of claim 9 wherein processing of the input speech results in frames of the features of the input speech and the method further comprises utilizing multiple paths through acoustic models for the input speech feature frames to generate scores, and applying at least one of a bias or penalty per frame to the input speech to affect the scores of paths through the models.

14. An apparatus for recognizing speech comprising:

processing circuitry including a match/search algorithm for performing speech recognition in a speech recognition system having a speech dialog with a grammar of possible responses and at least one expected response, the expected response to be received in user input speech in at least one point in the speech dialog, the at least one expected response being a subset of the grammar and known to be the at least one expected response in the speech recognition system before receiving the user input speech, the at least one expected response including the most likely response or responses expected to be uttered by the user at the at least one point in the speech dialog and having a model associated therewith;

the processing circuitry configured for modifying the speech recognition match/search algorithm with respect to the model that is associated with the expected response to be received as input speech from a user so that the match/search algorithm is configured to favor the expected response and boost a confidence factor associated with a hypothesis generated by the modified speech recognition match/search algorithm;

the processing circuitry further being configured for processing input speech from a user using the modified match/search algorithm to generate a hypothesis and confidence factor for the input speech.

15. The apparatus of claim 14 wherein the processing circuitry is further configured for comparing the hypothesis confidence factor to an acceptance threshold for accepting the hypothesis.

16. The apparatus of claim 14 wherein the match/search algorithm processes the input speech through a plurality of states and is modifiable by at least one of modifying transition probabilities associated with transitions between multiple states in the match/search algorithm or modifying initial state probabilities associated with a path through multiple states in the match/search algorithm.

17. The apparatus of claim 14 wherein the match/search algorithm utilizes multiple paths through acoustic models for the input speech and is modifiable by at least one of modifying the acoustic models based on the expected response or modifying the insertion penalty associated with a given acoustic model.

18. The apparatus of claim 14 wherein the processing circuitry creates frames of the features of the input speech and the match/search algorithm utilizes multiple paths through acoustic models for the input speech feature frames to generate scores, the algorithm applying at least one of a bias or penalty per frame to the input speech to affect the scores of paths through the models.

* * * * *